(12) United States Patent
Solomon et al.

(10) Patent No.: US 8,077,620 B2
(45) Date of Patent: Dec. 13, 2011

(54) METHODS AND APPARATUSES FOR PROCESSING PACKETS IN A CREDIT-BASED FLOW CONTROL SCHEME

(75) Inventors: Richard Solomon, Colorado Springs, CO (US); Eugene Saghi, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 398 days.

(21) Appl. No.: 12/247,845

(22) Filed: Oct. 8, 2008

(65) Prior Publication Data

US 2010/0085875 A1    Apr. 8, 2010

(51) Int. Cl.
*H04J 3/14* (2006.01)
(52) U.S. Cl. ............... 370/235; 370/235.1; 370/252
(58) Field of Classification Search .......... 370/235, 370/235.1, 252
See application file for complete search history.

(56) References Cited

U.S. PATENT DOCUMENTS

| | | | |
|---|---|---|---|
| 5,956,340 A * | 9/1999 | Afek et al. | 370/412 |
| 6,781,956 B1 * | 8/2004 | Cheung | 370/235.1 |
| 6,829,649 B1 * | 12/2004 | Shorey et al. | 709/235 |
| 7,327,682 B2 * | 2/2008 | Gandhi et al. | 370/235.1 |
| 2008/0107020 A1 * | 5/2008 | Trinh et al. | 370/229 |

* cited by examiner

*Primary Examiner* — Phuc Tran
(74) *Attorney, Agent, or Firm* — Duft Bornsen & Fishman LLP (57) ABSTRACT

Methods and systems for processing a second request before processing of a first request has completed. The first request is associated with a first flow control credit type, and the second request is associated with a second flow control credit type. After a period of time, the second request is selected for processing based on the first flow control credit type and the second flow control credit type.

19 Claims, 7 Drawing Sheets

METHODS AND APPARATUSES FOR PROCESSING PACKETS IN A CREDIT-BASED FLOW CONTROL SCHEME

BACKGROUND

1. Field of the Invention

The invention relates generally to credit-based flow control and more specifically relates to processing packets in a credit-based flow control scheme.

2. Discussion of Related Art

To manage the flow of data between a transmitter and a receiver, a flow control scheme is typically used to prevent the transmitter from transmitting additional data to the receiver when the receiver is not able to receive the additional data. In one flow control scheme, the receiver issues credits against which the transmitter may transmit data to the receiver. The transmitter may not transmit data to the receiver if doing so would consume more than the available credit. As the receiver becomes able to receive additional data, the receiver issues additional credits to the transmitter.

One exemplary credit-based flow control scheme is used by the Peripheral Component Interconnect ("PCI") Express standard. In this scheme, a data transmission is associated with a credit type for flow control purposes. There are six flow control credit types: posted request header, posted request data, non-posted request header, non-posted request data, completion header, and completion data. A receiving device initially advertises credits available for each flow control credit type. When a transmitting device transmits packets of a particular credit type to the receiving device, the transmitting device uses up credits of the particular credit type. After the receiving device finishes processing the packets, the receiving device signals the transmitting device to restore the available credit.

A PCI Express device can comprise multiple entities and their corresponding one or more functions. Each function (or entity) can initiate a request at the PCI Express Application Layer that results in the transmission of multiple packets (that also uses up credits of the corresponding credit type). Although multiple packets may be generated in a request, the PCI Express device begins to transmit packets even if there are not enough credits to complete the processing of the request.

The PCI Express device verifies that there is sufficient credit available before transmitting each packet. If sufficient credit is not available to transmit a packet, processing of the request is blocked. However, this causes processing of a second request to be stalled even if the second request would use a second credit type that is available, and the PCI Express device would thus be able to transmit packets generated from the second request. Stalling the processing of the second request leads to degraded performance of the PCI Express device just as maintaining high performance of the PCI Express device is becoming more critical in today's demanding data processing applications.

Thus it is an ongoing challenge to maintaining high performance of the PCI Express device through improved processing of packets in a credit-based flow control scheme.

SUMMARY

The present invention solves the above and other problems, thereby advancing the state of the useful arts, by providing methods and apparatuses for processing a second request/packet descriptor before processing of a first request/packet descriptor has completed. It is noted that a request can generally be seen as comprising a "packet descriptor" that describes packets to be transmitted for the request. The first packet descriptor is associated with a first flow control credit type, and the second packet descriptor is associated with a second flow control credit type. After a period of time, the second packet descriptor is selected for processing based on the first flow control credit type and the second flow control credit type. Accordingly, processing of the second packet descriptor is no longer stalled, and performance is improved as a result.

In one aspect hereof, a method is provided for processing a second packet descriptor before processing of a first packet descriptor has completed. The first packet descriptor is associated with a first flow control credit type, and the second packet descriptor is associated with a second flow control credit type. The method comprises processing the first packet descriptor and stalling the processing of the second packet descriptor. The method also comprises selecting, after a period of time, the second packet descriptor for processing based on the first flow control credit type and the second flow control credit type. Additionally, the method comprises processing the second packet descriptor.

Another aspect hereof provides an apparatus for processing a second packet descriptor before processing of a first packet descriptor has completed. The first packet descriptor is associated with a first flow control credit type, and the second packet descriptor is associated with a second flow control credit type. The apparatus comprises a processing element for processing the first packet descriptor and the second packet descriptor. The apparatus also comprises a stalling element for stalling the processing of the second packet descriptor. Additionally, the apparatus comprises a selecting element for selecting, after a period of time, the second packet descriptor for processing based on the first flow control credit type and the second flow control credit type.

DETAILED DESCRIPTION OF THE DRAWINGS

Figure 1:
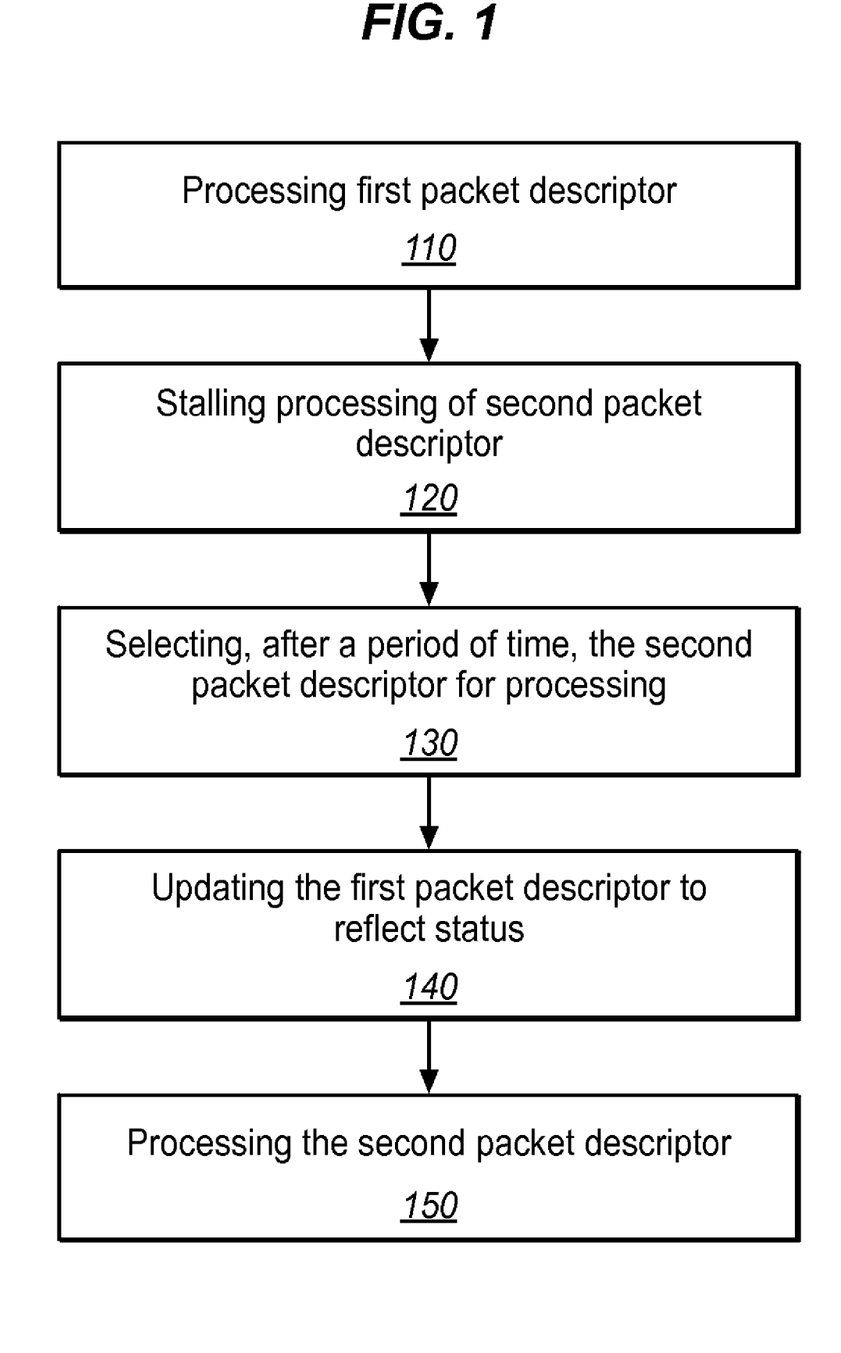
FIG. 1 is a flowchart describing an exemplary method in accordance with features and aspects hereof for processing a second packet descriptor before processing of a first packet descriptor has completed.

FIG. 1 is a flowchart describing an exemplary method in accordance with features and aspects hereof for processing a second packet descriptor ("PD") before processing of a first PD has completed. The first PD is associated with a first flow control credit type ("FCCT"), and the second PD is associated with a second FCCT. At step 110, a processor begins processing the first PD. While the processor processes the first PD, the processor stalls at step 120 processing of the second PD. At step 130, the processor selects, after a period of time, the second PD that has been stalled for processing. The step of selecting may be based on the first FCCT and the second FCCT as will be described in greater detail.

At step 140, the processor then updates the first PD to reflect a status of the processing of the first PD. It will be understood that the processor may generate multiple packets based on a single PD. Accordingly, the processor may have finished transmitting/processing a number of packets when the second PD is selected for processing after the period time. Step 140 thus ensures that the number of transmitted/processed packets is reflected in the first PD, allowing the processor to properly process the first PD at a later time. For example, a first PD may describe that 2000 bytes of remote data starting at remote address 3500 is to be read into a local buffer starting at local address 1000. Suppose that packets for reading the first 500 bytes of remote data have been transmitted when the processor selects the second PD for processing. The processor would then update the first PD to reflect that 500 bytes of remote data have been read, and/or that 1500 bytes of remote data starting at remote address 4000 remain to be read into the local buffer starting at local address 1500. At step 150, the processor begins processing the selected second PD.

Figure 2:
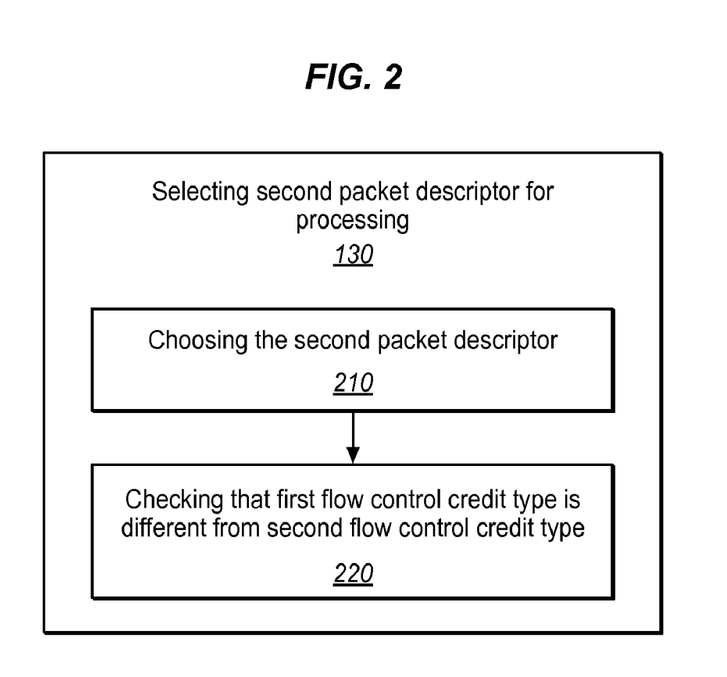
FIG. 2 is a flowchart describing exemplary additional details for selecting the second packet descriptor for processing in accordance with features and aspects hereof.

It is noted that in the example above, after reading the first 500 bytes of remote data, processing of the first PD may have been blocked for lack of credits of the first FCCT. However, credits of the second FCCT may be available that would allow the processor to transmit packets that are generated from the second PD, in that the processing of the second PD has been stalled while the processor processes the first PD. Advantageously, selecting the second PD for processing after the period of time improves performance as processing of the second PD would otherwise remain stalled. The processor or another entity may set a timer that is triggered after the period of time. Alternatively, the processor may time out after being blocked for the period of time. FIG. 2 is a flowchart describing exemplary additional details for selecting the second PD in step 130 of FIG. 1 for processing in accordance with features and aspects hereof.

At step 210, the processor chooses the second PD from a number of PDs. The PDs may be arranged in a variety of ways, some of which will be described in greater detail. For example, the PDs may be arranged in queues each with PDs associated with a particular function. It will be understood that packets of a "function" may be more generally defined as a group of packets whose sequence of processing should not be reordered. In this arrangement, a first queue may comprise the first PD and a second queue may comprise the second PD. At step 210, the processor may choose the second PD from PDs of the second queue so that the first and the second PDs are associated with different functions. At step 220, the processor checks that the first FCCT associated with the first PD is different from the second FCCT associated with the second PD. If the two PDs are associated with the same FCCT, the processor repeats the steps from 210 and chooses another PD from the second queue and/or from a third queue.

Figure 3:
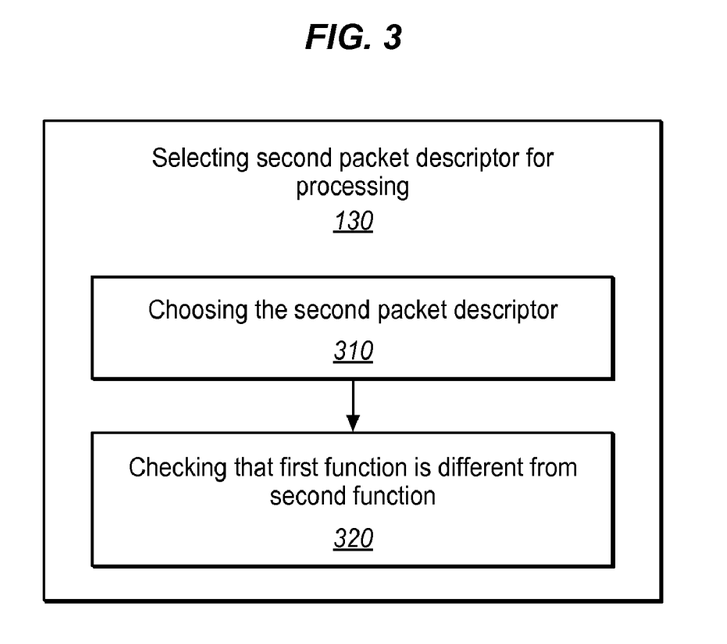
FIG. 3 is a flowchart describing alternative exemplary details for selecting the second packet descriptor for processing in accordance with features and aspects hereof.

FIG. 3 is a flowchart describing alternative exemplary details for selecting the second PD in step 130 of FIG. 1 for processing in accordance with features and aspects hereof. At step 310, the processor likewise chooses the second PD from a number of PDs. The PDs may alternatively be arranged in queues each with PDs associated with a particular FCCT. In this alternative arrangement, a first queue may comprise the first PD and a second queue may comprise the second PD. At step 310, the processor may choose the second PD from PDs of the second queue so that the first and the second PDs are associated with different FCCTs. At step 320, the processor checks that the first function associated with the first PD is different from the second function associated with the second PD. If the two PDs are associated with the same function, the processor repeats the steps from 310 and chooses another PD from the second queue and/or from a third queue.

Those of ordinary skill in the art will readily recognize numerous additional and equivalent steps that may be performed and/or omitted in the methods of FIGS. 1 through 3. Such additional and equivalent steps are omitted herein merely for brevity and simplicity of this discussion.

Figure 4:
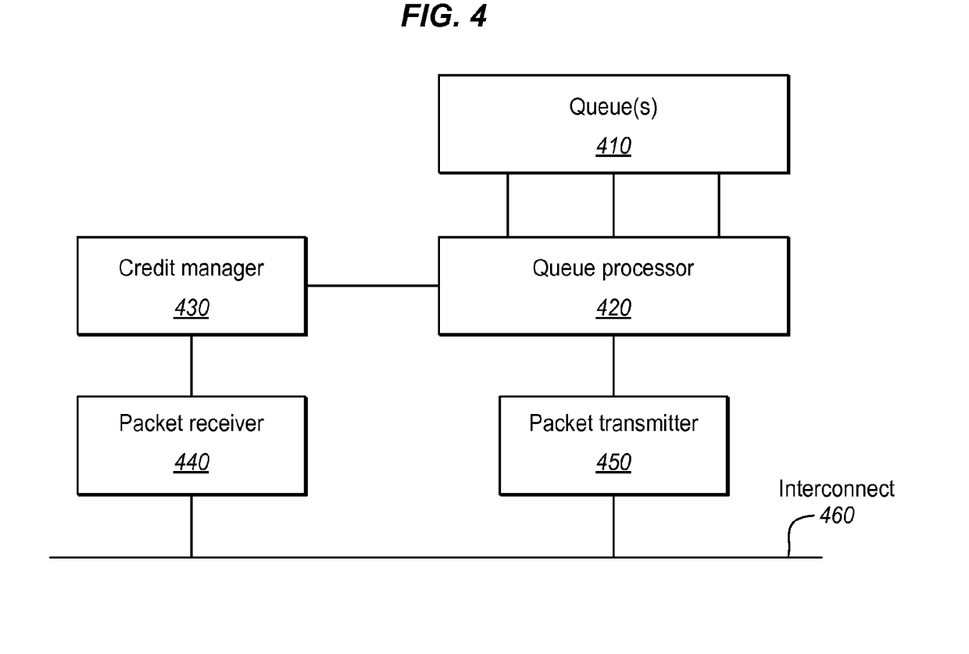
FIG. 4 is a block diagram of an exemplary apparatus in accordance with features and aspects hereof for processing a second packet descriptor before processing of a first packet descriptor has completed.

FIG. 4 is a block diagram of an exemplary apparatus in accordance with features and aspects hereof for processing a second PD before processing of a first PD has completed. The apparatus comprises one or more queue(s) 410 that comprise PDs. A queue processor 420 processes PDs of the queue(s) 410 and generates packets for transmission from a PD. However, prior to transmitting a packet, the queue processor 420 sends a request to a credit manager 430 to verify that sufficient credits of a FCCT associated with the PD is available. Meanwhile, the queue processor 420 sets a timer to be triggered after a period of time. Alternatively, the timer may be set by the credit manager 430 upon receipt of the request. If sufficient credit is available, the queue processor 420 forwards the packet to a packet transmitter 450 for transmission to a receiver over an interconnect 460. The queue processor 420 also communicates with the credit manager 430 so that the available credit for the FCCT is decreased. Additionally, the queue processor 420 or the credit manager 430 cancels the timer.

If sufficient credit is not available, processing of the PD becomes blocked, causing processing of other PDs to be stalled. A packet receiver 440 may receive packets over the interconnect 460 when the receiver signals that a number of credits of a FCCT may be restored. The packet receiver 440 passes this information to the credit manager 430 for processing, which may in turn unblock the processing of a PD that has been blocked for lack of credit of the FCCT. Alternatively, the timer may be triggered after the period of time and the queue processor 420 would select a second PD for processing. As another alternative, the queue processor 420 may time out after being blocked for the period of time, and would then also select the second PD for processing.

It will be understood that the apparatus may be a PCI Express device, and each or the elements may comprise circuitry, memory, processor, and/or instructions to perform the functions as described. The interconnect 460 may be a PCI Express interconnect for communication with a PCI Express switch.

Figure 5:
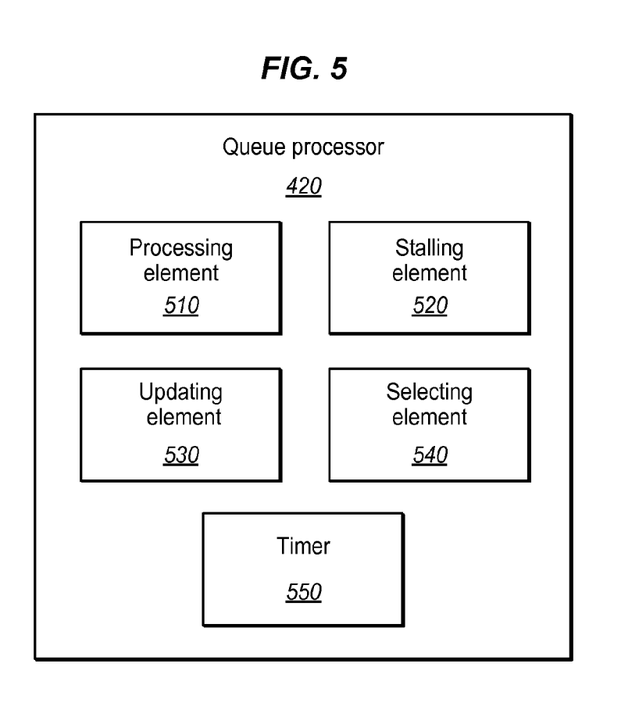
FIG. 5 is a block diagram describing exemplary additional details of a queue processor in accordance with features and aspects hereof.

FIG. 5 is a block diagram describing exemplary additional details of the queue processor 420 in FIG. 4 in accordance with features and aspects hereof. The queue processor 420 comprises a processing element 510 for processing the first PD and the second PD. The queue processor 420 also comprises a stalling element 520 for stalling the processing of the second PD, and an updating element 530 for updating the first PD to reflect a status of the processing of the first PD. Additionally, the queue processor 420 comprises a selecting element 540 for selecting, after a period of time, the second PD for processing based on the first flow control credit type and the second flow control credit type. The queue processor 420 also comprises a timer 550 that may be set to be triggered and/or timed out after a period of time. Among its design choices, the timer 550 may comprise counters that count between a small value and an "infinite" value (i.e., does not timeout).

Figure 6:
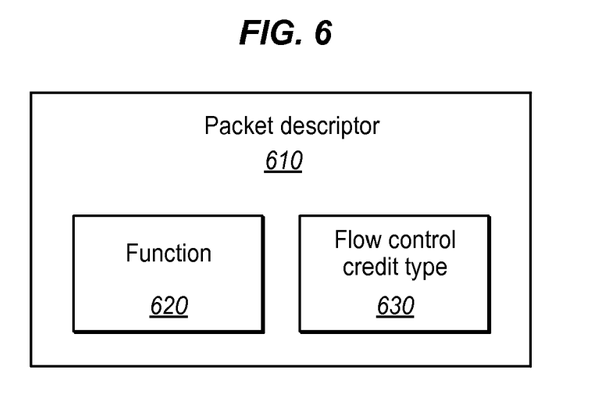
FIG. 6 is a block diagram describing exemplary additional details of a packet descriptor in accordance with features and aspects hereof.

FIG. 6 is a block diagram describing exemplary additional details of a PD 610 in accordance with features and aspects hereof. The PD 610 is associated with a function 620 and a FCCT 630. For example, the PD 610 may comprise a record or a data structure that comprises data fields for the function 620 and the FCCT 630 shown in FIG. 6. The function 620 may be any function performed by an apparatus including a PCI Express device. It will be understood that packets of a "function" may be more generally defined as a group of packets whose sequence of processing should not be reordered. In a PCI Express device, the FCCT 630 may be any one of the following types: posted request header, posted request data, non-posted request header, non-posted request data, completion header, and completion data. If credits of a particular FCCT are not available, a transmitter may not transmit packets of the particular FCCT.

Figure 7:
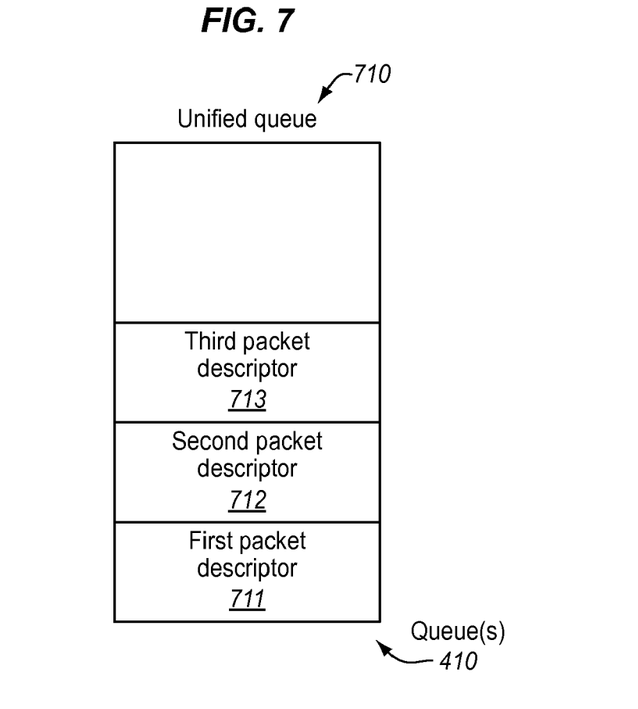
FIG. 7 is a block diagram describing exemplary additional details of a queue in accordance with features and aspects hereof.

FIG. 7 is a block diagram describing exemplary additional details of the queue(s) 410 in FIG. 4 in accordance with features and aspects hereof. The queue(s) 410 comprises a unified queue 710. The unified queue 710 comprises a first PD 711, a second PD 712, and a third PD 713. After the processor chooses the second PD 712, the processor would check that the second PD 712 is associated with a different function and a different FCCT than the first PD 711. If either the function or the FCCT is the same, the processor would choose the third PD 713 and perform the same checking between the first PD 711 and the third PD 713.

Figure 8:
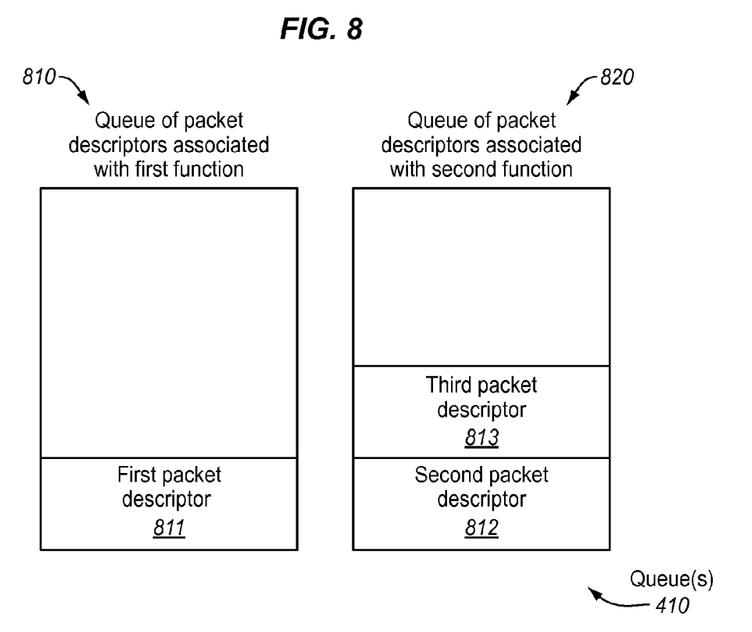
FIG. 8 is a block diagram describing alternative exemplary details of queues in accordance with features and aspects hereof.

FIG. 8 is a block diagram describing alternative exemplary details of the queue(s) 410 in FIG. 4 in accordance with features and aspects hereof. The queue(s) 410 comprises a first queue 810 and a second queue 820. The first queue 810 comprises PDs associated with a first function and the second queue 820 comprises PDs associated with a second function. The first queue 810 comprises the first PD 811, and the second queue 820 comprises the second PD 812 and the third PD 813. After the processor chooses the second PD 812 from the second queue 820, the processor would check that the second PD 812 is associated with a different FCCT than the first PD 811. Otherwise, the processor would choose the third PD 813 (or yet another PD from another queue) and perform the same checking between the first PD 811 and the third PD 813 (or yet another PD).

Figure 9:
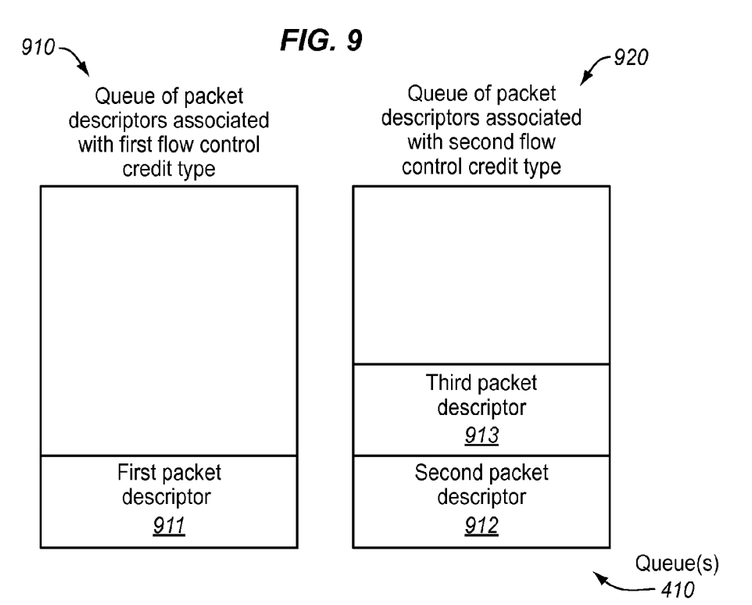
FIG. 9 is a block diagram describing alternative exemplary details of queues in accordance with features and aspects hereof.

FIG. 9 is a block diagram describing alternative exemplary details of the queue(s) 410 in FIG. 4 in accordance with features and aspects hereof. The queue(s) 410 comprises a first queue 910 and a second queue 920. The first queue 910 comprises PDs associated with a FCCT and the second queue 920 comprises PDs associated with a FCCT. The first queue 910 comprises the first PD 911, and the second queue 920 comprises the second PD 912 and the third PD 913. After the processor chooses the second PD 912 from the second queue 920, the processor would check that the second PD 912 is associated with a different function than the first PD 911. Otherwise, the processor would choose the third PD 913 (or yet another PD from another queue) and perform the same checking between the first PD 911 and the third PD 913 (or yet another PD).

Those of ordinary skill in the art will readily recognize numerous additional and equivalent components and modules within a fully functional apparatus. Such additional and equivalent components are omitted herein for simplicity and brevity of this discussion. Thus, the structures of FIGS. 4 through 9 are intended merely as representatives of exemplary embodiments of features and aspects hereof.

Figure 10:
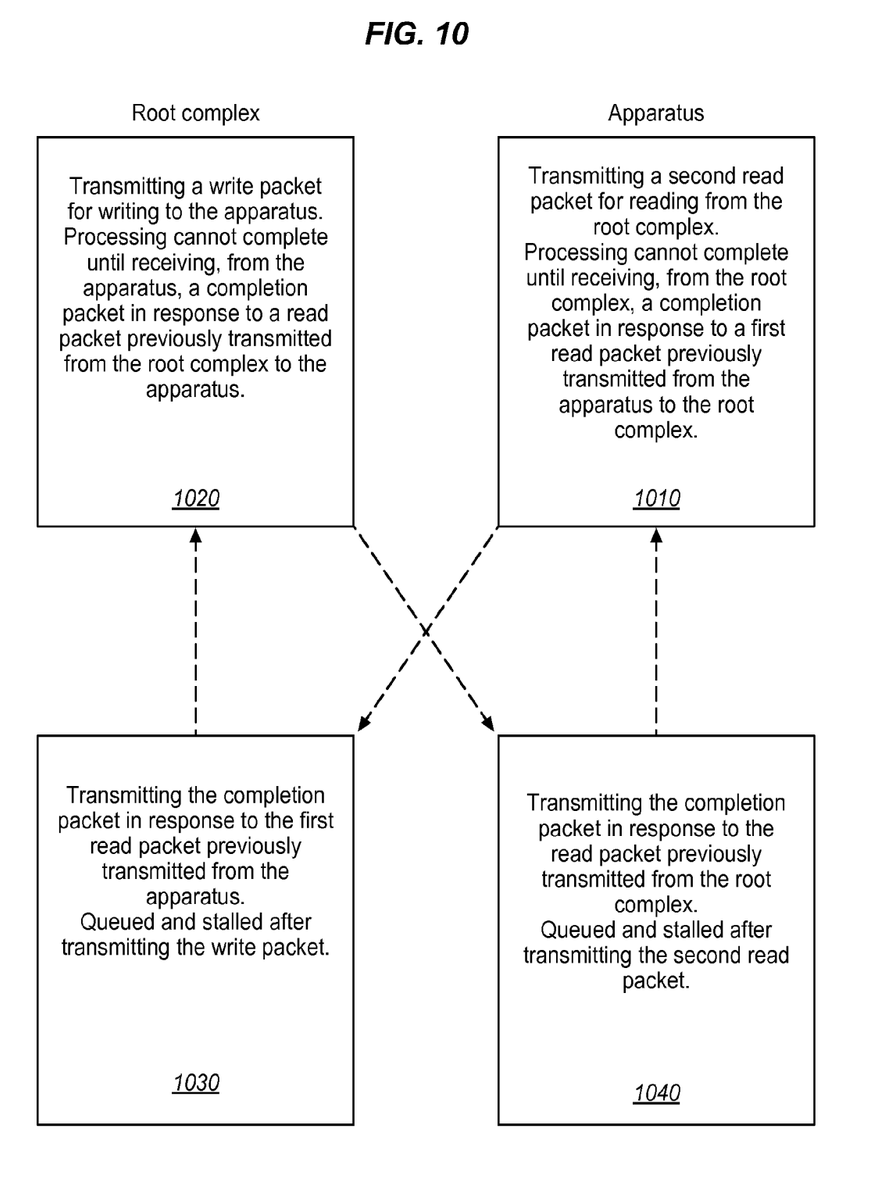
FIG. 10 is a diagram describing a deadlock condition.

FIG. 10 is a diagram describing a deadlock condition. In the figure, a dashed arrow line shows dependency at the pointed direction. For example, if a first block has a dashed arrow line pointing to a second block, the first block depends on the second block and processing of the first block is queued/stalled after the second block. FIG. 10 describes interactions between an apparatus (e.g., a PCI Express device) and a root complex (e.g., a PCI Express end point for interfacing with a central processor). At the apparatus, block 1010 describes transmitting a second read packet for reading from the root complex. Processing of block 1010 cannot complete until receiving, from the root complex, a completion packet in response to a first read packet previously transmitted from the apparatus to the root complex. At the root complex, block 1020 describes transmitting a write packet for writing to the apparatus. Processing of block 1020 cannot complete until receiving, from the apparatus, a completion packet in response to a read packet previously transmitted from the root complex to the apparatus.

Meanwhile, at the root complex, block 1030 describes transmitting the completion packet in response to the first read packet previously transmitted from the apparatus. However, processing of block 1030 is queued and stalled after transmitting the write packet (block 1020). At the apparatus, block 1040 describes transmitting the completion packet in response to the read packet previously transmitted from the root complex. However, processing of block 1040 is queued and stalled after transmitting the second read packet (block 1010). As a result, a deadlock condition is formed as neither the apparatus nor the root complex can transmit a packet while being blocked waiting to receive a packet from each other.

Figure 11:
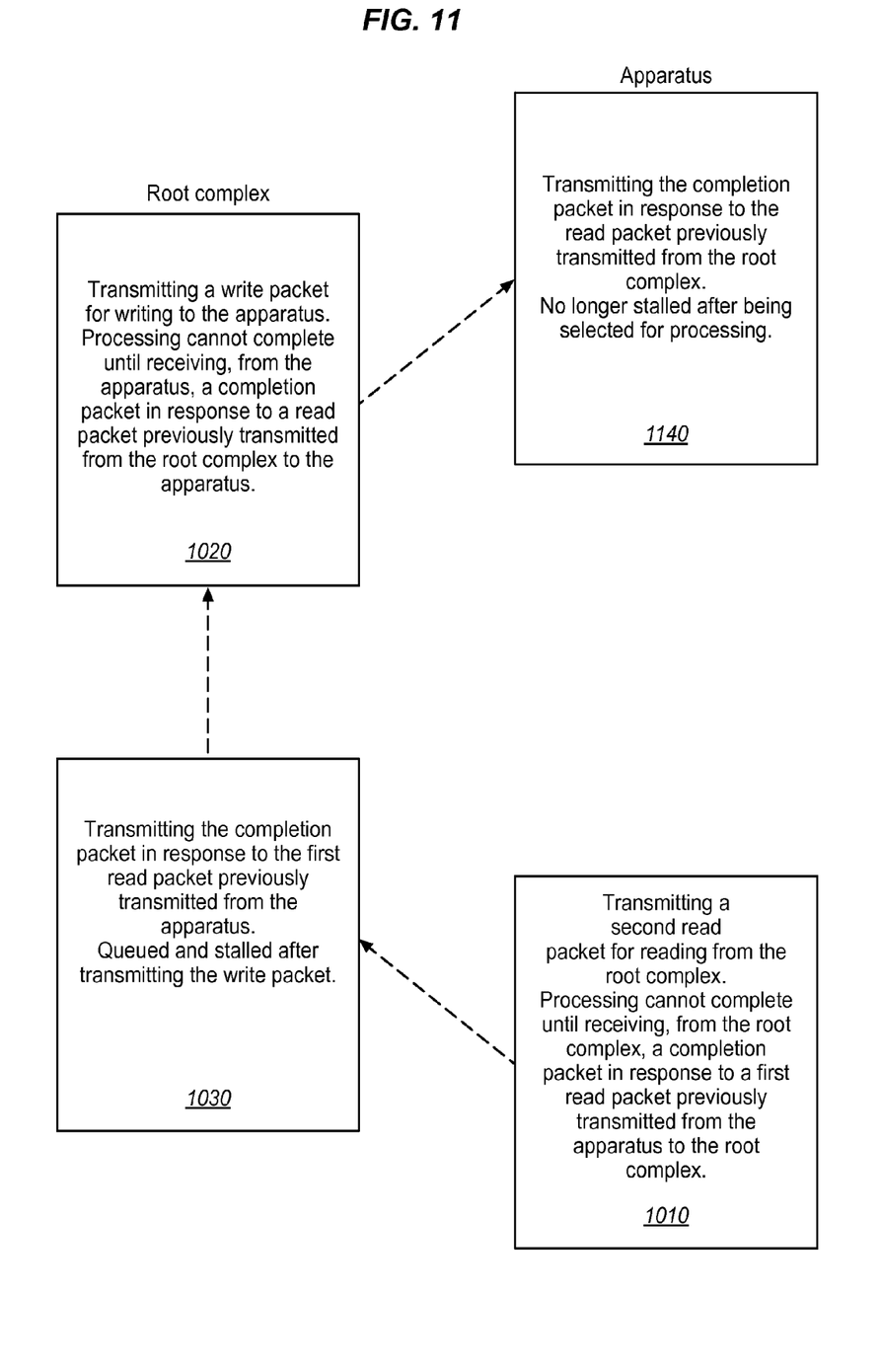
FIG. 11 is a diagram describing the deadlock condition having been corrected in accordance with features and aspects hereof.

FIG. 11 is a diagram describing the deadlock condition having been corrected in accordance with features and aspects hereof FIG. 11 is similar to FIG. 10 except that block 1140 is no longer stalled after being selected for processing after a period of time in accordance with features and aspects hereof. Accordingly, block 1020 may be processed after block 1140, block 1030 may be processed after block 1020, and block 1010 may be processed after block 1030 so there is no longer a deadlock condition. It is noted that at block 1010, the reason that processing cannot complete may be because there is insufficient credit of a FCCT. On the other hand, the reason that processing cannot complete may instead due to insufficient internal resources (e.g., insufficient buffer or memory space). Accordingly, it will be understood that features and aspects hereof may be applicable not just to improve processing of packets and packet descriptors in a credit-based flow control scheme, but also to avoid other problems including the potential deadlock condition including that described above.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for processing, with an electronic device, a second packet descriptor before processing of a first packet descriptor has completed, wherein the first packet descriptor is associated with a first flow control credit type, and wherein the second packet descriptor is associated with a second flow control credit type, the method comprising:
processing the first packet descriptor;
stalling the processing of the second packet descriptor;
selecting, after a period of time, the second packet descriptor for processing based on the first flow control credit type and the second flow control credit type;
updating the first packet descriptor to reflect a status of the processing of the first packet descriptor; and
processing the second packet descriptor.

2. The method of claim 1, wherein processing of the first packet descriptor is not completed, in part for lack of credits of the first flow control credit type.

3. The method of claim 1, wherein processing the first packet descriptor comprises setting a timer that is triggered after the period of time.

4. The method of claim 1, wherein the step of selecting comprises checking that the first flow control credit type is different from the second flow control credit type.

5. The method of claim 1, wherein the first packet descriptor is associated with a first function and the second packet descriptor is associated with a second function, and wherein the first function is different from the second function.

6. The method of claim 1, wherein the first packet descriptor describes at least one Peripheral Component Interconnect ("PCI") Express packet that is to be generated.

7. The method of claim 1, wherein the first flow control credit type comprises one of posted request header, posted request data, non-posted request header, non-posted request data, completion header, and completion data.

8. The method of claim 1, wherein:
a first queue comprises the first packet descriptor and a second queue comprises the second packet descriptor;
the first queue comprises packet descriptors associated with a first function;
the second queue comprises packet descriptors associated with a second function; and
the step of selecting comprises:
choosing the second packet descriptor from the second queue; and
checking that the first flow control credit type is different from the second flow control credit type.

9. The method of claim 1, wherein:
the first packet descriptor is associated with a first function and the second packet descriptor is associated with a second function;
a first queue comprises the first packet descriptor and a second queue comprises the second packet descriptor;
the first queue comprises packet descriptors associated with a first flow control credit type;
the second queue comprises packet descriptors associated with a second flow control credit type; and
the step of selecting comprises:
choosing the second packet descriptor from the second queue; and
checking that the first flow function is different from the second function.

10. An apparatus for processing a second packet descriptor before processing of a first packet descriptor has completed, wherein the first packet descriptor is associated with a first flow control credit type, and wherein the second packet descriptor is associated with a second flow control credit type, the apparatus comprising:
a processing element for processing the first packet descriptor and the second packet descriptor;
a stalling element for stalling the processing of the second packet descriptor; and
a selecting element for selecting, after a period of time, the second packet descriptor for processing based on the first flow control credit type and the second flow control credit type.

11. The apparatus of claim 10, further comprising:
an updating element for updating the first packet descriptor to reflect a status of the processing of the first packet descriptor.

12. The apparatus of claim 10, wherein processing of the first packet descriptor is not completed, in part for lack of credits of the first flow control credit type.

13. The apparatus of claim 10, wherein the processing element comprises a setting element for setting a timer that is triggered after the period of time.

14. The apparatus of claim 10, wherein the selecting element comprises a checking element for checking that the first flow control credit type is different from the second flow control credit type.

15. The apparatus of claim 10, wherein the first packet descriptor is associated with a first function and the second packet descriptor is associated with a second function, and wherein the first function is different from the second function.

16. The apparatus of claim 10, wherein the first packet descriptor describes a Peripheral Component Interconnect ("PCI") Express packet.

17. The apparatus of claim 10, wherein the first flow control credit type comprises one of posted request header, posted request data, non-posted request header, non-posted request data, completion header, and completion data.

18. The apparatus of claim 10, further comprising a first queue comprising the first packet descriptor and a second queue comprising the second packet descriptor, wherein:
the first queue comprises packet descriptors associated with a first function;
the second queue comprising packet descriptors associated with a second function; and
the selecting element comprises:
a choosing element for choosing the second packet descriptor from the second queue; and
a checking element for checking that the first flow control credit type is different from the second flow control credit type.

19. The apparatus of claim 10, wherein the first packet descriptor is associated with a first function and the second packet descriptor is associated with a second function, the apparatus further comprising a first queue comprises the first packet descriptor and a second queue comprises the second packet descriptor, wherein:
the first queue comprises packet descriptors associated with a first flow control credit type;
the second queue comprises packet descriptors associated with a second flow control credit type; and
the selecting element comprises:
a choosing element for choosing the second packet descriptor from the second queue; and
a checking element for checking that the first function is different from the second function.

* * * * *